(12) United States Patent
Hoeksel et al.

(10) Patent No.: US 8,831,518 B2
(45) Date of Patent: Sep. 9, 2014

(54) DEVICE AND METHOD FOR CONTACTLESS SHORT RANGE COMMUNICATION

(75) Inventors: Sebastiaan Hoeksel, Maastricht (NL); Nicholas Bone, Berkshire (GB); Anita Döhler, Mettmann (DE)

(73) Assignee: Vodafone Holding GmbH, Dusseldorf (DE)

( * ) Notice: Subject to any disclaimer, the term of this patent is extended or adjusted under 35 U.S.C. 154(b) by 189 days.

(21) Appl. No.: 13/272,839

(22) Filed: Oct. 13, 2011

(65) Prior Publication Data

US 2012/0094603 A1    Apr. 19, 2012

(30) Foreign Application Priority Data

Oct. 19, 2010    (EP) ..................................... 10188081

(51) Int. Cl.
  *H04B 7/00*    (2006.01)
  *G06Q 20/32*   (2012.01)
  *H04L 29/06*   (2006.01)
  *H04L 29/08*   (2006.01)
  *G06F 9/445*   (2006.01)

(52) U.S. Cl.
  CPC ........ *G06Q 20/3226* (2013.01); *G06Q 20/3229* (2013.01); *G06Q 20/32* (2013.01); *H04L 63/0853* (2013.01); *G06F 8/61* (2013.01); *G06Q 20/3278* (2013.01); *H04L 67/12* (2013.01)
  USPC .......................... 455/41.2; 455/41.1; 455/558

(58) Field of Classification Search
  USPC ........................ 455/41.1, 41.2, 558
  See application file for complete search history.

(56) References Cited

U.S. PATENT DOCUMENTS

| | | | |
|---|---|---|---|
| 7,209,733 B2 * | 4/2007 | Ortiz et al. | 455/414.1 |
| 8,116,678 B2 * | 2/2012 | Johnson et al. | 455/41.1 |
| 8,447,836 B2 * | 5/2013 | Mahalal et al. | 709/219 |

* cited by examiner

*Primary Examiner* — Tuan H Nguyen
(74) *Attorney, Agent, or Firm* — International IP Law Group, PLLC

(57) ABSTRACT

The subject innovation relates to a device for contactless short range communication. An exemplary device comprises a contactless communication module enabled for contactless short range communication with an external target. A processor of the device is configured to execute at least one contactless application. The exemplary device includes a smart card external to the processor and connected to the contactless communication module. The smart card provides an interface used by the contactless application to access functions of the contactless communication module via the smart card.

14 Claims, 1 Drawing Sheet

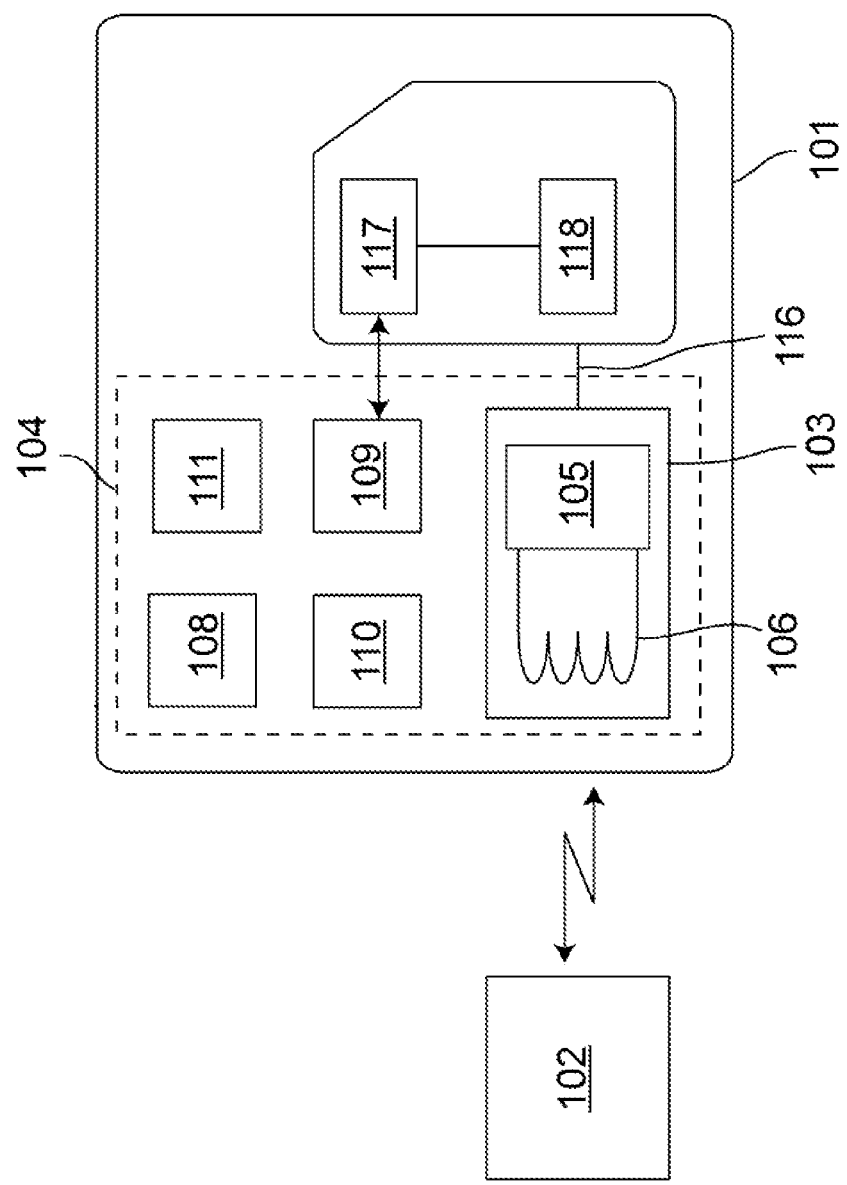

DEVICE AND METHOD FOR CONTACTLESS SHORT RANGE COMMUNICATION

CROSS-REFERENCE TO RELATED APPLICATION

This application claims priority to European (EP) Patent Application No. 10 188 081.3-2413, filed on Oct. 19, 2010, the contents of which are incorporated by reference as if set forth in their entirety herein.

BACKGROUND

Portable contactless devices, such as, for example, mobile communication devices, such as cellular phones, PDAs (PDA: Personal Data Assistant), or dedicated devices can dispose of a communication interface for wireless short range communication with a target. Such an interface can be used for executing transactions between the mobile device and the target. The transactions may be financial transactions allowing making an electronic payment using the mobile device. Another example is an electronic ticketing transaction, in which an electronic ticket is provided by the mobile device and validated by the target.

The contactless communication interface usually comprises a controller that controls the antenna on the lower levels, particularly on the physical level and possibly on the level of the contactless data exchange protocols. On an application level the execution of transactions is controlled by contactless applications. In case of transactions, such as financial transactions, which involve sensitive data, the contactless applications are executed in a secure element connected to the contactless communication interface. The secure element provides a security architecture preventing unauthorized third parties from accessing the sensitive data.

It has already been proposed to integrate the secure element into a smartcard included in the contactless device, which includes a processor for executing applications, and which is coupled to the contactless interface. In case of a mobile communication device, the smart card may be a user identification card, which may be a SIM (Subscriber Identity Module) card according to the GSM (Global System for Mobile Communications) standard or a UICC (Universal Integrated Circuit Card) comprising a USIM (Universal Subscriber Identity Module) application according to the UMTS (Universal Mobile Telecommunications System), for example. Such smart card provides secure identification and/or authentication services towards a mobile communication network, in which the mobile communication device is used. By utilizing the user identification card for executing contactless transactions, the existing security architecture of the user identification card can be used.

However, the resources of a smart card to store and/or execute applications are usually relatively restricted and there may be contactless applications which require a lower degree of security than the smart card provides. Therefore, it may be advantageous to be able to execute at least selected contactless applications not in the smart card but in another processor of a contactless device in order to conserve resources of the smart card. A further reason for executing a contactless application in another processor of the contactless device may be that such applications may be easier to develop than applications for execution in a smart card, particularly since higher level programming languages may be used.

Contactless applications executed in a further processor outside of the smart card coupled to the contactless interface may use an interface within the device to access the contactless interface. One example of such interface is the Contactless Communication API (Application Programming Interface) described in the document JSR (Java Specification Request) 257.

A first drawback of such interface may be that accesses to the contactless interface via the interface may conflict with accesses by contactless applications executed in the smart card, so that an appropriate conflict management has to be provided. Conflict management may for example involve the user manually selecting whether contactless applications in the smart card or in the processor external to the smart card are allowed access to the contactless communication interface.

Furthermore, the security level of contactless applications executed in the smart card may be reduced, when the smart card loses exclusive access to the communication interface. For instance, a malicious application executed outside the smart card could be presented to the user with a similar look and feel as a secure application executed in the smart card and the user could not be aware of different security levels. The application could, for example, launch a phishing attack and ask the user to input sensitive data, such as, for example, banking details or passwords. Also, a malicious application executed outside the smart card may preempt the communication interface and prevent that contactless applications executed on the smart card gain access to the communication interface.

SUMMARY

The subject innovation relates to contactless short range communication. More specific ally, the subject innovation is related to a device and a method for short range communication. Furthermore, the subject innovation relates to a smart card for use in the device.

An embodiment of the subject innovation allows contactless applications to be executed in a processor outside a smart card coupled to a contactless interface of a contactless device in a more secure way.

According to a first aspect of the subject innovation, a device for contactless short range communication is suggested. The device comprises a contactless communication module enabled for contactless short range communication with an external target and a smart card being connected to the contactless communication module and the device further comprises a processor outside the smart card, the processor being adapted to execute at least one contactless application. The smart card provides an interface used by the contactless application to access functions of the contactless communication module via the smart card.

According to a second aspect, the subject innovation suggests a smart card for use in the device and in its embodiments. The smart card provides an interface used by a contactless application executable in a processor of the device outside the smart card for accessing functions of the contactless communication module via the smart card.

According to a further aspect, the subject innovation suggests a method for contactless short range communication using a device comprising a contactless communication module enabled for contactless short range communication with an external target and a smart card being connected to the contactless communication module. In the method, a contactless application executed in a processor of the device outside the smart card executes a transaction with the external target using the contactless communication module, the contactless application accessing the contactless communication module via an interface provided by the smart card.

The interface of the smart card allowing contactless applications outside the smart card to access the communication module via the smart card makes it possible to maintain the exclusive access to the communication module by the smart card also when contactless applications are executed outside the smart card. Hereby, also the high security level connected with an exclusive access by the smart card can be maintained.

Furthermore, it is not necessary to modify the communication module such that it is directly accessible for contactless applications executed outside the smart card. In particular, the communication module does not require a conflict management. Rather, a conflict management can be provided by the smart card, for example.

In one exemplary embodiment of the device and the method, the device comprises a handset to which the smart card is connected, the contactless communication module being included in the handset. Thus, the invention can be applied in connection with a handset, which provides a contactless communication module which is adapted to interact with a smart card through an interface of the handset. Such handsets may be particularly provided for use with a smart card as secure element for executing contactless transactions as already described before.

In a further exemplary embodiment of the method, the device and the smart card, the smart card is adapted to provide to the contactless application via the interface information about communication capabilities supported by the contactless communication module. This particularly allows the contactless application to adapt its functionality to the supported communication capabilities, such as, for example the transmission modes supported by the communication module.

Furthermore, in one exemplary embodiment of the method, the device and the smart card, the smart card is adapted to set parameters stored in the contactless communication module in response to a command received from the contactless application via the interface. Thus, the contactless application is able to configure the contactless communication module via the interface provided by the smart card.

In one exemplary embodiment of the method, the device and the smart card, the smart card is adapted to provide to the contactless application via the interface information about an operating state of the contactless communication module. The information about the operating state may comprise information whether the communication module is activated or deactivated.

Moreover, in one exemplary embodiment of the method, the device and the smart card, the smart card is adapted to activate and/or deactivate the contactless communication module and/or a radio field generated by the contactless communication module in response to a command received from the contactless application via the interface.

A further exemplary embodiment of the method, the device and the smart card provides that the smart card is adapted to send via the interface a notification to the contactless application in response to a detection of an external target by the contactless communication module. Upon this notification, the contactless application may initiate the execution of a transaction with the external target. As an alternative, the notification may include a first message of the transaction sent by the external target, if the target initiates the transaction.

Advantageously, when executing a transaction, data may be exchanged between the contactless application and the external target via the smart card and the interface provided by the smart card. For this purpose, one exemplary embodiment of the method, the device and the smart card provides that the smart card is adapted to forward via the interface data received from an external target connected to the contactless communication module to the contactless application and/or to forward data provided by the contactless application via the interface to the external target.

In a further exemplary embodiment of the device, the method and the smart card, the smart card is adapted to block an access of the contactless application to the interface, if a further contactless application is accessing the communication module. Hereby, it is prevented that multiple contactless applications interact with the communication module simultaneously. In this way, conflicts between contactless applications are prevented. In particular, the contactless communication module does not have to implement conflict management functionality.

Furthermore, the smart card may host further contactless applications and these applications may have priority over the applications executed outside the smart card. Therefore, in one exemplary embodiment of the device, the method and the smart card, the smart card includes at least one internal contactless application and wherein the smart card is adapted to block an access to the interface by the external contactless application, when the internal contactless application is executed.

A further exemplary embodiment of the method, the device and the smart card includes that information is exchanged between the interface and the contactless application using HTTP (Hypertext Transfer Protocol) or HTTPS (Hypertext Transfer Protocol Secure). The information may comprise data of a transaction and or commands. It is an advantage of this embodiment that existing functionality of the contactless device for handling HTTP and HTTPS can be used for realizing the communication between the contactless application and the interface. In particular, in mobile communication devices enabled to access Internet services, such functionality is already present.

In one implementation, which allows the utilization of HTTP or HTTPS, the interface comprises a web server provided by the smart card. In particular, the interface may comprise a Smart Card Web Server (SCWS) as specified by the OMA (Open Mobile Alliance).

Moreover, in one exemplary embodiment of the device, the method and the smart card, the device is a mobile communication device and the smart card provides functionality for identifying and/or authenticating a subscriber in a mobile communication network. In particular, the smart card may be SIM card or a UICC comprising a USIM application.

BRIEF DESCRIPTION OF THE DRAWING

The aforementioned and other aspects of the subject innovation will be apparent from and elucidated with reference to the embodiments described hereinafter making reference to the accompanying drawing. In the drawing, FIG. 1 is a block diagram of a mobile communication device according to the subject innovation.

DETAILED DESCRIPTION OF SPECIFIC EMBODIMENTS

FIG. 1 schematically depicts a contactless device 101, which is capable of communicating wirelessly with targets 102 in order to execute transactions with the targets 102. In FIG. 1, one target 102 is depicted by way of example although the device 101 may be capable of communicating with a plurality of targets 102, which may be configured according to the same type or according to different types (e.g., there may be several targets 102 of one type for executing a transaction of certain type and/or there may be targets 102 of different types to execute transactions of different types). The targets 102 may be terminals, as it is usually the case in payment of ticketing applications, or the targets may be further contactless appliances, such as, for example, RFID (Radio Frequency Identification) tags.

The device 101 comprises a communication module 103, which includes a controller 105 and an antenna 106. The antenna 106 is configured to receive radio signals from the target 102 and/or to transmit radio signals that can be received in the target 102. The target 102 disposes of corresponding transmitting and/or receiving modules so that the target 102 can transmit radio signals to the device 101 and/or receive radio signals sent from the device 101.

The controller 105 controls the antenna 106 on the physical layer. This means that the controller 105 sets up the operation mode of the communication module 103 and controls the exchange of the radio signal between the antenna 106 and the target 102. For this purpose, the controller 105 implements one or more communication protocols, each of which may be supported by at least one target 102. Moreover, the controller 105 communicates with a contactless application that controls the data exchange between the device 101 and the target 102 on the application level. Here, the controller 105 forwards data messages received via the antenna 106 to the contactless application concerned and controls the antenna 106 to transmit data messages received from this application to the target 102. The functionalities of the controller 105 are preferably provided by a microcontroller comprising a microprocessor for executing software code implementing the control functions and a memory for storing programs and data used by the programs.

The communication between the device 101 and the target 102 uses a short range communication technology, which allows for exchanging data between the device 101 and the target 102 over a short range between several centimeters and several ten centimeters. In one embodiment, the communication is based on at least one of the specifications ISO 14443 Type A, ISO 14443 Type B, ISO 18092 and ISO 15693.

In particular, the NFC technology (NFC: Near Field Communication) may be used, which is specified in ISO 18092 and 21481, ECMA 340, 352 and 356, and ETSI TS 102 109 and implements the aforementioned specifications. The NFC technology allows for contactless communication between devices over a short distance of a few centimeters, for example about 1 to 4 centimeters. In this embodiment, the antenna 106 is configured as a magnetic loop antenna operating at a carrier frequency of 13.56 MHz and a radio signal can be exchanged over a distance of about several centimeters. Moreover, the communication module 103 can be operated in several different modes, which correspond to the different tag types defined in the NFC specifications and which differ in the communication protocols used and in the data transmission rates, for example. Type 1 and type 2 tags are based on the specification ISO 14443 type A, type 3 tags use the specification ISO 18092 and type 4 tags are compatible to the specifications ISO 14443 type A and type B.

Furthermore, an NFC enabled communication module 103 can be operated in an active and in a passive communication mode. In the active communication mode the communication component 103 and the target 102 each generate a high frequency field at the carrier frequency in order to send data to the communication partner. In the passive communication mode only one communication partner, which is called initiator, generates a high frequency field at the carrier frequency that is used by the initiator to transmit data to the other communication partner which is called target. The target uses load modulation for transmitting data to the initiator. This means that the current through the antenna 106 of the target is modulated using a controllable resistor. In the passive communication mode, the communication component 103 may be the initiator of the communication as well as the target. In case the communication component 103 acts as the target, the communication component 103, and in particular the controller 105, may be powered by the high frequency field generated by the initiator. For being operable in further operation modes the communication component 103 disposes of a power supply.

In case the communication module 103 implements the NFC technology and in further embodiments, the device 101 can interact with the target 102 in order to execute transactions with the target 102. The transactions may be payment transactions or ticketing transactions, for example. From the perspective of the user of the device 101, a transaction may simply be executed by bringing the device 101 in proximity to the target 102 for a relatively short time. Thus, payment can be made or an electronic ticket can be presented for validation by passing the device 101 past the target 102.

In the device 101, the transaction is controlled by one or more contactless applications, which control the execution of the transactions and which provide the data necessary for executing the transactions. For each type of transaction, one corresponding contactless application may be provided. Furthermore, a contactless application may be configured to interact with certain targets 102, such as, for example terminals 102 operated by a certain service provider. The contactless applications may be executed in card emulation mode or in reader mode.

In card emulation mode, a contactless application is activated in a selection process using information included in a message received from the terminal 102. This message may be the message that initiates the transaction. For carrying out the selection process, the device 101 comprises a selection unit, which evaluates the message from the terminal 102 and determines an application based on information included in the message. For instance, such information may identify a specific application, a service provider and/or a specific transaction. The determined contactless application may be activated by the selection unit, i.e. the selection may initiate the application and/or it may allow the application to access the communication module 103.

Contactless applications installed in the device 101, which are executed in card emulation mode, are preferably registered in the selection unit. The registration of an application comprises the information which is used by the selection unit to select the application. Particularly, the registration may specify the content of a message of a target 102, which is representative for a selection of the application. In one embodiment, all registered applications may be selectable. In a further embodiment, the selectable applications may be pre-selected by the user or by another process in the contactless device 101.

A contactless application executed in reader mode is selected in the device 101 before a transaction is executed and independent of information received from a target 102. In particular, the application may be selected by the user of the device. For this purpose the selection unit may provide a suitable user interface, which presents the available contactless applications at the device 101 and allows the user to select one contactless application using a user input at the device 101. In response to a user selection of a contactless application, the selection unit may activate the application. In addition or as an alternative, a contactless application executed in reader mode may be selected and activated automatically by the selection unit in response to a detection of certain predetermined event in the device 101, which is different from a user input. The contactless applications installed in the device 101, which are executed in reader mode, are preferably also registered in the selection unit 101. For such a contactless application, the registration may specify that the application is to be presented to the user for selection, and/or the registration may specify the event or events leading to an activation of the application.

The device 101 comprises a handset 104 and a smart card 107 which is connected to the handset 104. The handset 104 includes a main processor 109 for controlling functions of the handset 104 and for executing software programs stored in the handset, particularly in a memory 110 coupled to the main processor 109. For interacting with the user of the device 101, the handset comprises a user interface 111. The user interface 111 may include visual and/or acoustic output device, such as, for example, a display unit and/or a loudspeaker. Furthermore, it may comprise input device, such as for example a keyboard, keypad and/or a joystick or the like.

In the embodiment depicted in FIG. 1, the device 101 is a mobile communication device and may be configured as a cellular phone, a PDA (Personal Data Assistant) or the like. In this embodiment, the device 101 can be connected wirelessly to a mobile communication network, which is not shown in the FIGURE, using a radio module 108 included in the handset 104. For instance, the mobile communication network may be a GSM or a UMTS network (GSM: Global System for Mobile Telecommunications; UMTS: Universal Mobile Telecommunications System).

The smart card 107 includes a microcontroller, which may comprise a processor for controlling functions of the smart card 107 and for executing software applications. Furthermore, the microcontroller comprises a memory for storing software that can be executed in the processor and for storing further data. The smart card 107 and its microcontroller preferably provide a secure environment for executing software applications in the processor and for storing data in the memory. In particular, this means that the microcontroller is especially secured against unauthorized access to and manipulations of processes executed in the microcontroller and data stored therein. Furthermore, the microcontroller of the smart card 107 is enabled to securely provide cryptographic functions using cryptographic algorithms implemented in the processor or in another co-processor of the microcontroller. The cryptographic functions may be particularly accessed by applications and/or processes executed the smart card 107.

In case the device 101 is a mobile communication device, the smart card 107 may be used in conjunction with a utilization of the device 101 in the mobile communication network. In particular, the smart card 107 may comprise an application, which provides secure identification and authentication services to the mobile communication network. If the mobile communication network is a GSM network, the smart card may be configured as a SIM card according to the GSM standard comprising a SIM application, which provides the identification and authentication services. If the mobile communication network is a UMTS network, the smart card 107 may be configured as a UICC comprising a USIM application that provides the identification and authentication services.

The smart card 107 is coupled to the contactless communication module 103 which is integrated into the handset 104 of the device 101. The coupling is achieved using an interface 116 that may implement the SWP (Single Wire Protocol) which has been developed particularly in view of NFC applications. The SWP enables the smart card 107 to communicate with the communication module 103 via an electric contact of the smart card 107, which is particularly not used in telecommunications for a communication between the smart card 107 and the handset 104. In a higher layer, the communication between the smart card 107 and the communication module 103 may be based on the HCI (Host Controller Interface) protocol. In alternative embodiment, the interface 116 between the smart card 107 and the communication module 103 may implement one or more other communication protocols.

In the microcontroller of the smart card 107, one or more contactless applications may be stored and executed. Such applications may require a relatively high degree of security and may involve sensitive data which are protected against unauthorized access using the security architecture of the smart card 107. Examples of such applications are banking and/or payment applications or ticketing applications. The contactless applications hosted in the smart card 107 may access the contactless communication module 103 directly through the interface 116 between the smart card 107 and the communication module 103.

Furthermore, at least one contactless application is installed and executed in the contactless device 101 outside the smart card 107. In particular, the contactless application may be executed in the main processor 109 of the device 101. However, it is likewise possible that the contactless application is installed and executed in another processor of the device 101, which is not shown in FIG. 1. For instance, this may be another secured or unsecured processor which may be integrated into the handset 104, or which may be included in another smart card inserted into the handset 104. In particular, if the contactless application is executed in the main processor 109 of the handset, the contactless application may require a lower level of security compared with the contactless application executed in the smart card 107. An example is an application which is capable of communicating with contactless tags applied to certain products in order to read product information.

The contactless applications executed outside the smart card 107 access the contactless communication module 103 of the handset via the smart card 107. For this purpose, the smart card 107 provides an interface 117, particularly an API, which is used by such application to access the functions of the communication module 103. When an application access the interface, the smart card 107 can interact with the communication module 103 for the application using the interface 116 between the smart card and the communication module 103.

In one embodiment, the interface 117 for accessing the functions of the communication module 103 is configured as a web server provided by the smart card 107. The web server may be particularly a Smart Card Web Server (SCWS) as specified by the OMA and may be implemented as software executed in the microcontroller of the smart card 107. The communication between contactless application and the web server is based on the HTTP or the HTTPS. Thus, for exchanging messages and further data between an application and the web server the handset may provide functionality of establishing connections using HTTP or HTTPS. In particular, this functionality facilitates the routing of data within the mobile communication device 101 using HTTP or HTTPS. Such functionality may be provided by the operating system of the handset 104 and is already included in the operating of many handsets, particularly mobile communication devices in which HTTP or HTTPS are also used for other purposes. In particular, the HTTP channel to the web server may be implemented using TCP (Transmission Control Protocol) and BIP (Bearer Independent Protocol) or TCP over a USB (Universal Serial Bus) interface of the smart card 107. For addressing data to the web server, a URL (Uniform Resource Locator) is assigned to the web server, which is known in the device 101.

In further embodiments, the interface 117 is not configured as a web server, For instance, the interface 117 can also be realized using a JAVA API, particularly an API realized using JSR 177.

The interface 117 is connected to a control unit 118, which is enabled to access the communication module 103 via the interface 116 between the smart card 107 and the communication module 103. The control unit 118 may be configured as a servlet application. In some embodiments, the control unit 118 may also be integrated into the interface 117 provided to the contactless application executed outside the smart card 107.

Access to the interface 117 of the smart card 107 may be restricted with access rules. Such access rules may provide that a utilization of the interface 117 is restricted to contactless applications having predetermined properties. The properties are verified with a corresponding function of the interface 117, which allows or denies access based on the result of the check. In particular, the access rules may allow restricting access to the functions of the interface 117 to predetermined defined contactless applications or to groups of contactless applications. A group may comprise applications of a predetermined application provider or applications having other common properties. It may be possible for an administrator (i.e. an authorized entity or person) to modify the access rules during the lifetime of the smart card 107 in order to adapt the access rules.

Via the interface 117, a (authorized) contactless application may retrieve information about the communication capabilities of the communication module 103. In particular, the contactless application may retrieve information about the RF technology types, particularly the supported tag types, and/or the communication modes supported by the communication module 103. For retrieving the capability information, the contactless application may transmit a corresponding request to the interface 117. The request may be forwarded to the control unit 118. The control unit 118 answers the request and the answer is transmitted back to the contactless application. For answering the request, the capabilities may be specified within the smart card 107 and accessible by the control unit 118. As an alternative, the control unit 118 forwards the request to the communication module 103, which provides the information about its communication capabilities to the control unit 118 which forwards the information as an answer to the contactless application.

A contactless application may be able to use different communication technologies (particularly different tag types and/or communication modes) in order to be executable in different contactless devices 101. Using the information about the communication capabilities, the contactless application may configure itself such that it uses the available communication technologies.

Furthermore, the interface 117 may allow a contactless application to configure parameters, particularly protocol parameters, to be used by the communication module 103. The parameters may be transmitted to the interface 117 within a setting request. The setting request may be forwarded to the control unit 118, which transmits the parameters to the communication module 103 together with a command to set the parameters. Examples of such parameters are the protocol parameters described in ETSI TS 102 622. The protocol parameters may be set in the RF gate registries of the communication module 103 as described in the aforementioned document. For applications operating in reader mode, particularly according to ISO 14443 type A, the parameters include the maximum supported data rate. For applications operating in reader mode according to ISO 14443 type B parameters include the application family identifier and the higher layer data. For applications operating in card emulation mode according to ISO 14443 type A the protocol parameters include values for the UID, SAK, ATQA, historical bytes, FWI, SFGI, CID and maximum data rate; and for applications operating in card emulation mode according to ISO 14443 type B the protocol parameters include values for PUPI, AFI, ATQB, response to ATTRIB and the maximum data rate. ISO 14443-3 and ISO 14443-4 describe how these protocol parameters may be used by the communication module 103 as part of a contactless transaction between the device 101 and the target 102.

A contactless application may also be able retrieve the current operating state of the communication module 103 via the interface 117, i.e. whether the communication module 103 is activated or deactivated. For this purpose, a corresponding request may be transmitted to the interface 117 and forwarded to the control unit 118 which answers the request after having determined the operating state of the communication module 103. The operating state of the communication module 103 may be known in the control unit 118; or alternatively the control unit 118 may request the current operating state of the communication module 103 via the interface 116.

Furthermore, a contactless application may control or change the operation state of the communication module 103 via the interface 117. In particular, the contactless application may activate and deactivate a radio field generated by the communication module 103 (in active mode). Thus, the contactless application can activate the radio field for executing a transaction, when it is deactivated. The radio field particularly allows external targets 102 to discover the contactless device 101. The radio field may be deactivated after the execution of a transaction with an external target 102 in order to avoid contacting further external targets 102. In addition to or as an alternative of the activation and deactivation of the radio field, a contactless application may activate and deactivate the communication module 103 via the interface 117. The contactless application may again activate and deactivate the communication module 103 before and after the execution of a transaction with an external target 102.

In contrast to the deactivation of the radio field, which prevents the contactless device 103 from getting into contact with external targets 102 communicating in passive mode, the deactivation of the communication module 103 also prevents that the contactless device 103 can be accessed by external targets communicating in active mode. The option to deactivate the communication module 103 may be selected, if it is intended to safeguard the contactless device against being discovered and accessed by external devices. When only the radio field is turned off, the contactless device is still capable of executing transactions with external targets communicating in active mode.

After a contactless application executed outside the smart card 107 has finished a transaction with an external target, it may set the communication module 103 into the operating state used before the transaction, which has been changed by the application in order to execute the transaction. This particularly means that the communication module 103 is deactivated, if it has been activated by the application, and that only the radio field is deactivated, if it has been activated by the application, but if the communication module 103 has been activated before. Thus, a "default state" which has been set before can be maintained.

For controlling the operating state of the communication module 103 in the way described before, commands may be provided for activating and deactivating the radio field and/or the communication module 103. Such commands may be transmitted to the interface 117 and upon receipt of a command the control unit 118 may set the operating state of the communication module 103 accordingly via the interface 116 between the smart card 107 and the communication module.

Particularly in order to initiate a communication with an external target 102, a contactless application outside the smart card 107 may command the control unit 118 via the interface 117 to notify the application, when an external target 102 has been detected by the communication module 103.

If the contactless application is a reader mode application, the contactless application may command the control unit 118 to poll for external targets 102 (i.e. targets operating in card emulation mode). Upon receipt of the command, the control unit 118 controls the communication module 103 accordingly and the communication module 103 notifies the control module 118, when an external target 102 is detected. Thereupon, the control module 118 may send a notification to the contactless application that an external target 102 has been detected. The notification may comprise details concerning the detected external target 102 which may have been transmitted by the target 102. The details may comprise an identification code of the target 102, the supported data transmission rates of the target and/or one or more further parameters specified in ETSI TS 102 622.

If the contactless application is executed in card emulation, the control unit 118 may notify the application, when the signals of an external target operating in reader mode have been received in the communication module 103. The notification may include details or parameters concerning the external target 102. Examples are particularly described in ETSI TS 102 622 as described before. The notification may also comprise the initial message of the external target for initiating a transaction. If multiple contactless applications are active in the contactless device 101, the notification about the detection of an external target 102 in reader mode may be transmitted to an application selected from the active applications as described above. The selection may be made by a selection unit included in the smart card 107 which is coupled to the control unit 118 forwarding the notification upon selection of an application in the selection unit.

In order to allow a contactless application outside the smart card 107 to execute a transaction with the external target, data to be send to the external target may be forwarded from the contactless application to the communication module 103 via the interface 117. Transaction data sent from the external target 102 may be forwarded to the contactless application via the interface 117.

In case of a reader mode contactless application, the contactless application may send data to be transmitted to the external target to the interface 117 together with a command to send the data. The data and the command are received in the control unit 118. Upon receipt of the data and the command the control unit 118 forwards the data to the contactless communication module 103 via the interface 116 between the smart card 107 and the communication module 103 and instructs the communication module 103 to transmit the data to the external target 102. The answer of the external target 102, which is received in the communication module 103 and forwarded via the smart card 107 particularly via the interface 117 and preferably also via the control unit 118.

When the communication module 103 receives data from an external target 102 operating in reader mode, the communication module 103 forwards the data to the smart card 107 and the data are received in the control unit 118. The control unit forwards the data via the interface 117 to the contactless application provided for executing the transaction. In case of several active contactless applications this may be the application which has been selected before. The answer of the application is transmitted to the smart card 107 via the interface, and the control unit 118 forwards the answer to the communication module 103, which sends the answer to the external target 102.

Furthermore, the smart card 107 provides functionality for avoiding the conflict of contactless application, which may occur, when two or more applications access the communication module 103 simultaneously. In one embodiment, it is ensures that (at maximum) one contactless application accesses the communication module 103 at each time. Hereby, conflicts between contactless applications can be avoided and the security can be increased, since it is prevented that an application executed in a processor with a low security level and an application executed in the smart card 107 simultaneously access the communication module 103.

In order to achieve this, the interface 117 may be configured such that access by a contactless application is blocked, when another application is already accessing the interface 117. Hereby, a conflict of contactless applications executed outside the smart card 107 is avoided. Moreover, the conflict of a contactless application executed in the smart card 107 with contactless applications executed outside the smart card 107 is prevented. In one embodiment, the applications executed in the smart card 107 have priority over the external applications. In this embodiment, the interface 117 may not be accessible by external applications, when a contactless application executed in the smart card 107 accesses the communication module 103.

Conflicts may also be avoided for contactless applications executed in the card emulation mode. In particular, the interface 117 may be blocked for other contactless applications after one contactless application has been selected for executing a transaction. Thus, the interface 117 is blocked for applications executed outside the smart card 107 until the termination of the transaction, when an internal contactless application has been selected. When an external application has been selected, the interface 117 is being blocked for further external applications. In both cases, the blocking of the interface 117 effects reader mode applications and card emulation applications. The selection may be made by a selection unit within the smart card 107 as described before.

The selection of external and internal contactless applications may be centralized in the smart card 107. For this purpose, external and internal applications may be registered in the selection unit of the smart card 107 and the selection unit is capable of accessing the user interface 111 of the handset 104 in order to present the registered applications for selection to the user of the contactless device 101. Upon selection, the selection unit initiates the selected application within the handset 104. In this embodiment, the selection unit may not allow the user to select a further application, when one application is already accessing the communication module 103. Here, the conflict avoidance mechanism described before avoids conflicts with an application that is initiated independent from the selection unit (e.g. a malicious application).

In further embodiments, external and internal applications may be selected independently of each other using an external and an internal selection unit. In this case, particularly the conflict avoidance mechanism described before ensures that external and internal applications do not collide.

According to one of the aforementioned embodiments, the selection of reader mode applications may be made. In addition or as an alternative, the pre-selection of card emulation mode applications may be done in the same way. Here, multiple card emulation mode applications may be pre-selected simultaneously. However, the conflict avoidance mechanism may ensure that only one application accesses the communication module 103 at a time.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

What is claimed is:

1. A device for contactless short range communication, the device comprising:
    a contactless communication module enabled for contactless short range communication with an external target;
    a processor external to a smart card, the processor being configured to execute at least one contactless application; and
    the smart card, connected to the contactless communication module by means of a first interface that enables a contactless application, executing on the smart card, to access the contactless communication module, the smart card providing a second interface to the processor that enables the at least one contactless application, executing on the processor external to the smart card, to access functions of the contactless communication module via the smart card.

2. The device recited in claim 1, comprising a handset to which the smart card is connected, the contactless communication module being included in the handset.

3. The device recited in claim 1, the interface providing to the contactless application information about communication capabilities supported by the contactless communication module.

4. The device recited in claim 1, the smart card being configured to set parameters stored in the contactless communication module in response to a command received from the contactless application via the second interface.

5. The device recited in claim 1, the smart card being configured to provide to the contactless application via the second interface information about an operating state of the contactless communication module.

6. The device recited in claim 1, the smart card being configured to activate and/or deactivate the contactless communication module and/or a radio field generated by the contactless communication module in response to a command received from the contactless application via the second interface.

7. The device recited in claim 1, the smart card being configured to send via the second interface a notification to the contactless application in response to a detection of an external target by the contactless communication module.

8. The device recited in claim 1, the smart card being configured to forward via the second interface data received from an external target connected to the contactless communication module to the contactless application and/or to forward data provided by the contactless application via the interface to the external target.

9. The device recited in claim 1, the smart card being configured to block an access of the contactless application to the second interface, if a further contactless application is accessing the communication module.

10. The device recited in claim 1, the smart card including at least one internal contactless application, and the second interface being configured to block an access to the contactless communication module by the external contactless application, when the internal contactless application is executed.

11. The device recited in claim 1, wherein information is exchanged between the second interface and the contactless application using HTTP or HTTPS.

12. The device recited in claim 1, wherein the second interface comprises a web server provided by the smart card.

13. The device recited in claim 1, wherein device is a mobile communication device and the smart card provides functionality for identifying and/or authenticating a subscriber in a mobile communication network.

14. A method for contactless short range communication using a device that includes a contactless communication module enabled for contactless short range communication with an external target and a smart card being connected to the contactless communication module, the method comprises:
    executing a contactless application in a processor of the device, the processor of the device being external to the smart card;
    executing a transaction with the external target using the contactless communication module; and accessing, by a contactless application executing on the processor of the device, the contactless communication module via a first interface between the processor and the smartcard and a second interface provided by the smart card between the smartcard and the contactless application.

* * * * *